United States Patent [19]

Guenette et al.

[11] Patent Number: 5,525,773
[45] Date of Patent: Jun. 11, 1996

[54] ADAPTOR FOR USE WITH A SUBMERGED ARC WELDER

[76] Inventors: Robert A. Guenette; Pierre F. Guenette, both of 6840-4th Avenue N.E., Calgary, Alberta, Canada, T2A 6N3

[21] Appl. No.: 370,171

[22] Filed: Jan. 9, 1995

[51] Int. Cl.⁶ .................................................. B23K 9/18
[52] U.S. Cl. ..................................................... 219/73.2
[58] Field of Search ................... 219/73, 73.2, 137.61

[56] References Cited

U.S. PATENT DOCUMENTS

| | | | |
|---|---|---|---|
| 2,386,466 | 10/1945 | Hyde. | |
| 2,478,525 | 8/1949 | Cutrer | 219/137.61 |
| 2,510,204 | 6/1950 | Baird | 219/73.2 |
| 3,582,599 | 6/1971 | Yohn | 219/73.2 |
| 3,659,076 | 4/1972 | Ogden, Sr. | 219/130 |
| 3,728,514 | 4/1973 | Bernard et al. | 219/130 |
| 4,347,427 | 8/1982 | Gentilo et al. | 219/137.8 |

OTHER PUBLICATIONS

Sheet IM-278-A with respect to NA-3 and NA-4 Automatic Welding Systems; Sheet IM-279 with respect to LT-7 Lightweight Tractor; Sheet IM-306-A with respect to Idealarc DC-600 from Operating Manual of The Lincoln Electric Company published at least as early as 1993.

*Primary Examiner*—Clifford C. Shaw
*Attorney, Agent, or Firm*—G. F. Gallinger

[57] ABSTRACT

An adaptor for use with a submerged arc welder is described which includes a wire feed tube and a flux feed tube. The wire feed tube is at least one foot in length and has a first end and a second end. Exterior threads are provided for attaching the first end of the wire feed tube to a wire feeding mechanism of a submerged arc welder. Interior threads are provided for attaching a tip to the second end of the wire feed tube. The flux feed tube is at least one foot in length and has a first end and a second end. The flux feed tube is disposed immediately adjacent and substantially parallel to the wire feed tube with the second end of the flux feed tube adjacent the second end of the wire feed tube. An insulating sheathing covers both the wire feed tube and the flux feed tube, thereby maintaining the wire feed tube and the flux feed tube in parallel relation.

9 Claims, 4 Drawing Sheets

ADAPTOR FOR USE WITH A SUBMERGED ARC WELDER

FIELD OF THE INVENTION

The present invention relates to an adaptor for attachment of an arc welding gun of a submerged arc welder, and in particular an adaptor intended to assist in reaching into confined areas.

BACKGROUND OF THE INVENTION

Arc welding guns used with arc welding equipment have an extremely limited reach; usually only a matter of a few inches. This creates a problem when working within confined areas. This limits the ability of persons skilled in the art to use arc welding techniques inside small bore tubing or fittings. This similarly limits their ability to use arc welding techniques when access to the area needing welding is obstructed by the positioning of structural members that form part of the workpiece.

SUMMARY OF THE INVENTION

What is required is an adaptor that can be attached to an arc welding gun of a submerged arc welder to reach into confined areas.

According to the present invention there is provided an adaptor for use with a Submerged Arc Welder which includes a wire feed tube and a flux feed tube. The wire feed tube is at least one foot in length and has a first end and a second end. Means is provided for attaching the first end of the wire feed tube to a wire feeding mechanism of a submerged arc welder. Means is provided for attaching a tip to the second end of the wire feed tube. The flux feed tube is at least one foot in length and has a first end and a second end. The flux feed tube is disposed immediately adjacent and substantially parallel to the wire feed tube with the second end of the flux feed tube adjacent the second end of the wire feed tube. An insulating sheathing covers both the wire feed tube and the flux feed tube, thereby maintaining the wire feed tube and the flux feed tube in parallel relation.

The adaptor, as described above, can be provided in any desired length until a practical limit of approximately 10 feet is reached. Through the use of the adaptor welds can be performed that are impossible using convention equipment.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
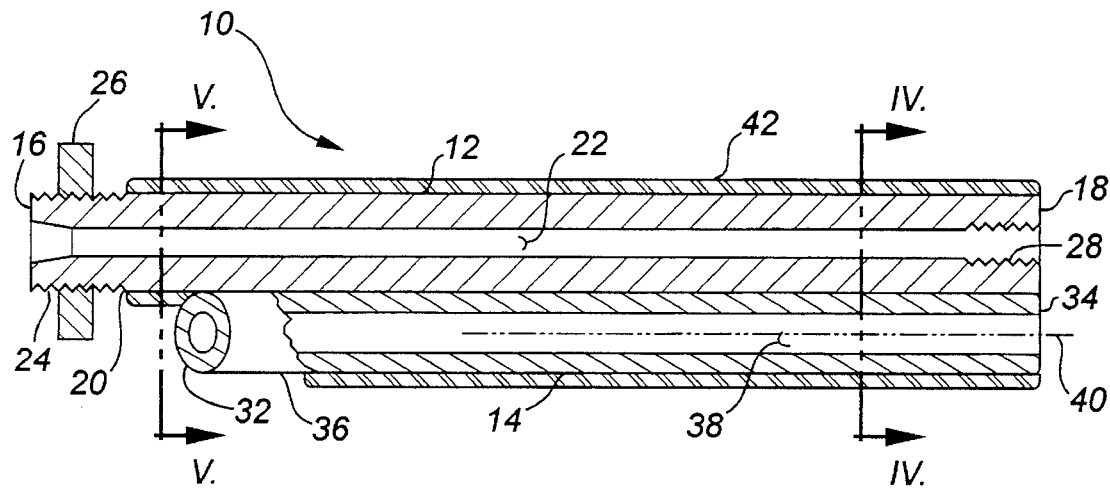
FIG. 1 is a side elevation in section of an adaptor constructed in accordance with the teachings of the present invention.

The preferred embodiment, an adaptor for use with a Submerged Arc Welder generally identified by reference numeral 10, will now be described with reference to FIGS. 1 through 8.

Figure 2:
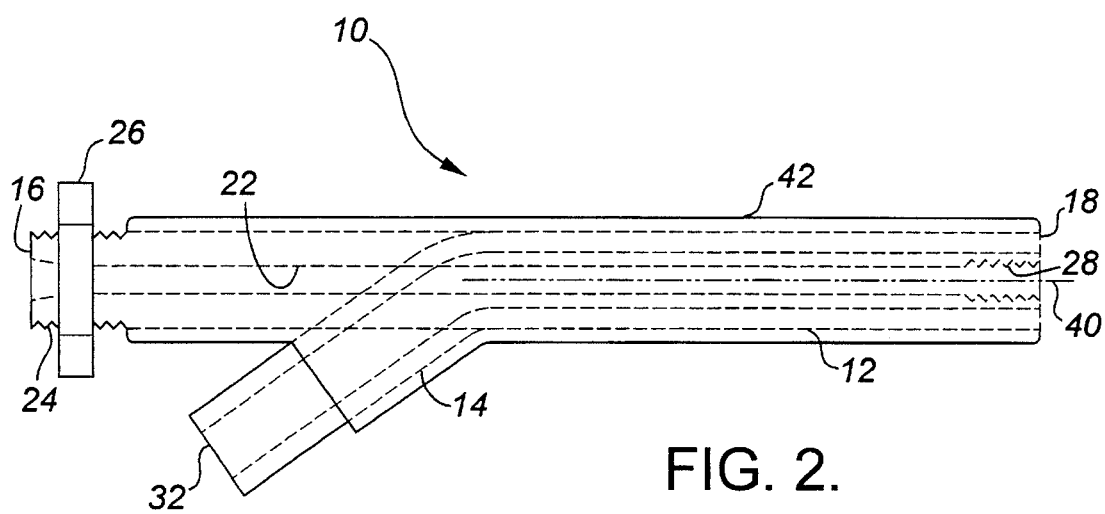
FIG. 2 is a top plan view of the adaptor illustrated in FIG. 1.
Figure 6:
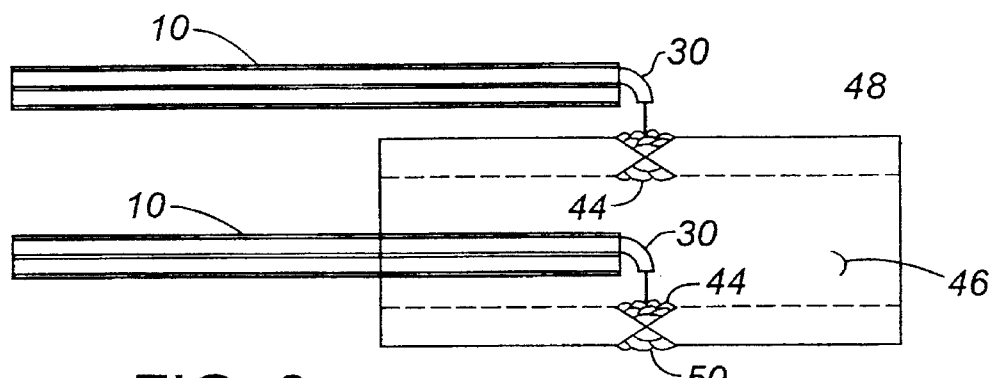
FIG. 6 is a side elevation view in partial section of the apparatus illustrated in FIG. 1, performing a weld in tubing.
Figure 7:
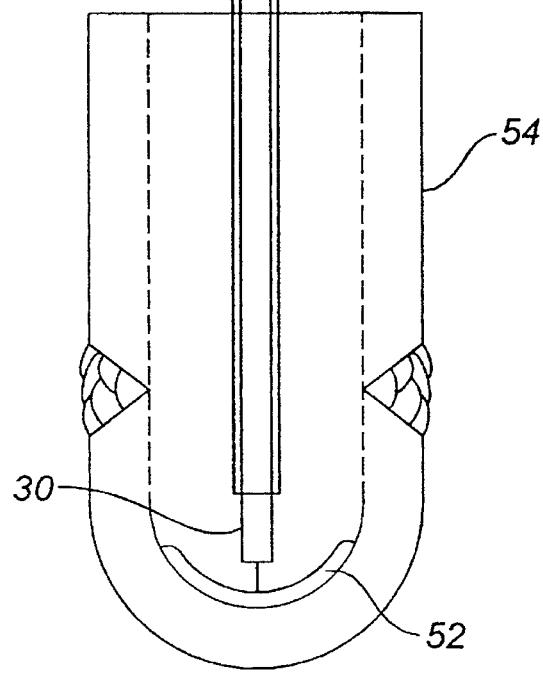
FIG. 7 is a top plan view in partial section of the apparatus illustrated in FIG. 1, performing a weld within a blind bore.
Figure 8:
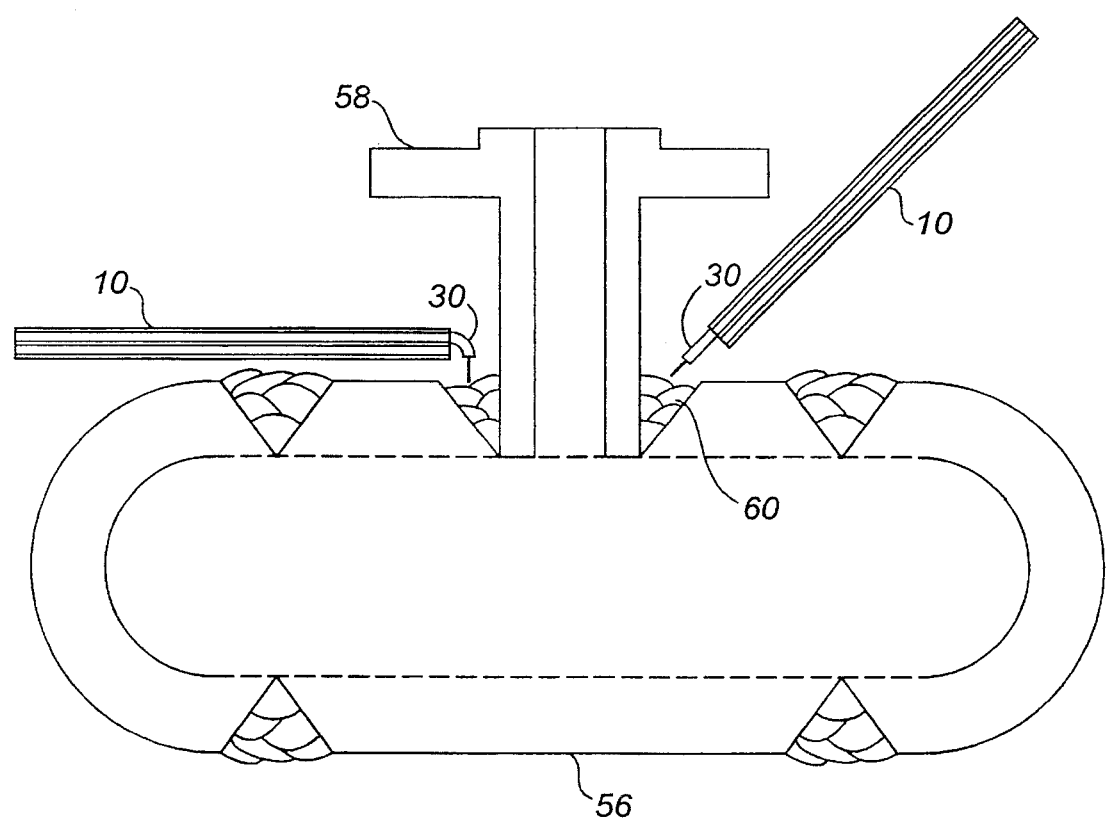
FIG. 8 is side elevation view in partial section of the apparatus illustrated in FIG. 1, performing a weld on a workpiece with obstructed access.

Referring to FIG. 1, adaptor 10 includes a wire feed tube 12 and a flux feed tube 14. Wire feed tube 12 is a straight tube at least one foot in length and can be as much as ten feet in length. Wire feed tube 12 has a first end 16, a second end 18, an exterior surface 20 and an interior bore 22 that extends between first end 16 and second end 18. It is preferred that wire feed tube 12 be made out of a copper alloy material with high thermal conductivity. This enables heat within wire feed tube 12 to be rapidly dissipated. As the length of adaptor 10 increases it is important to dissipate heat as adaptor 10 must maintain its rigidity. Should the material out of which wire feed tube 12 is constructed soften due to excess heat buildup, a sagging will occur. It will be understood how important maintaining rigidity is when welding inside long tubular objects of restricted diameter. It has been found that the electrical characteristics of copper alloy allow enough power robe run through wire feed tube 12 to allow the melting of wire sizes ranging from 0.035 to 0.093 without melting or other adverse affects due to resistance. External threads 24 are provided on exterior surface 20 at first end 16 of wire feed tube 12. This enables first end 16 of wire feed tube 12 to be attached by means of a nut 26 to a wire feeding mechanism of a submerged arc welder (not shown). Internal threads 28 are provided within interior bore 22 at second end 18 of wire feed tube 12. Internal threads 28 provide a means for attaching a tip 30 to second end 18 of wire feed tube 12, as illustrated in FIGS. 6 through 8. Referring to FIG. 1, flux feed tube 14 is at least one foot in length and can be as much as ten feet in length. Flux feed tube 14 has a first end 32, a second end 34, an exterior surface 36 and an interior bore 38 that extends between first end 32 and second end 34. It is preferred that flux feed tube 14 be made out of a non-corrosive stainless steel material. During the process of arc welding, air with flux feed tube 14 is surrounded by hot air originating from the vicinity of the weld. This results in condensation occurring within flux feed tube 14 which results in corrosion and, ultimately, a restriction of the flow of flux through flux feed tube 14. The use of non-corrosive material, such as stainless steel, eliminates the corrosion problem. Stainless steel is preferred due to the smooth surface it provides. This smooth surface allows flux to be delivered under low pressure, which reduces or eliminates dangers associated with pressure blow out at second end 34. This eliminates the need for any protective housing or shroud over second end 34. In addition, the mechanical strength of stainless steel provides the stiffness required for lengths approaching 10 feet. Sagging problems that result in surface dragging and adversely effect weld appearance and quality are not encountered. Flux feed tube 14 is disposed immediately adjacent and substantially parallel to wire feed tube 12 with second end 34 of flux feed tube 14 adjacent second end 18 of wire feed tube 12. Referring to FIGS. 2, flux feed tube 14 has a primary axis 40. First end 32 of flux feed tube 14 is angularly offset from primary axis 40. This enables attachment of first end 32 of flux feed tube 14 to a source of flux without interference from wire feed tube 12.

Figure 3:
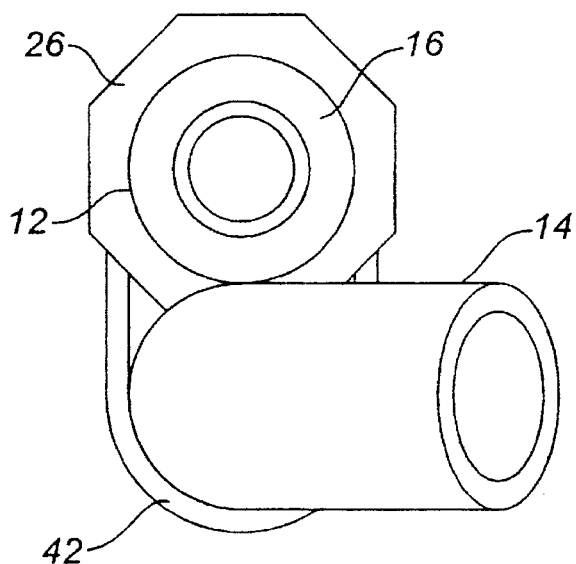
FIG. 3 is an left end elevation view of the adaptor illustrated in FIG. 1.
Figure 4:
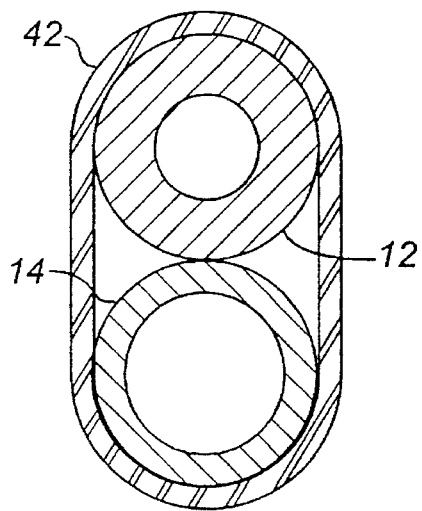
FIG. 4 is a section view taken along section lines A—A of FIG. 1.
Figure 5:
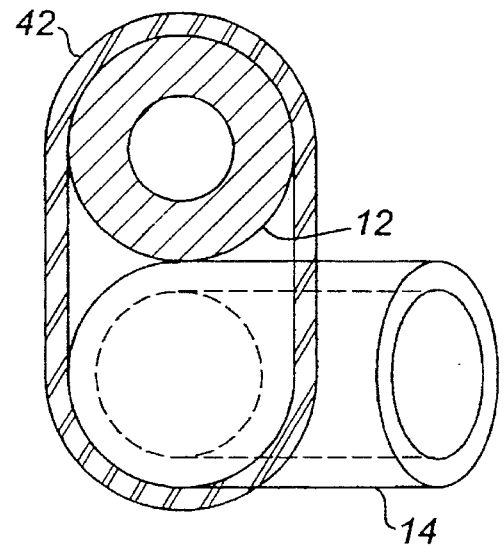
FIG. 5 is a section view taken along section lines B—B of FIG. 1.

This is further illustrated in FIG. 3 and 4. Referring to FIGS. 4 and 5, an insulating sheathing 42 made out of a woven glass material covers both wire feed tube 12 and flux feed tube 14. This maintains wire feed tube 12 and flux feed tube 14 in parallel relation. Beneficial results have been obtained using a woven glass material that comes in a tape format sold commercially under the Trademark "THERMOCHEM". The tape is wrapped around wire feed tube 12 and flux feed tube 14 to complete insulating sheathing 42.

The use and operation of adaptor 10 will now be described with reference to FIGS. 1 through 8. In order to use adaptor 10, a tip 30 appropriate for the job is selected and secured to second end 18 of wire feed tube 12 by means of internal threads 28. First end 16 of wire feed tube 12 is attached to a wire feeding mechanism of a submerged arc welder (not shown) by means of nut 26 and external threads 24 on exterior surface 20. First end 32 of flux feed tube 14 is attached to a source of flux. Referring to FIG. 6, adaptor 10 is illustrated in the process of completing a weld 44 within interior bore 46 of tubing 48. Adaptor 10 is also illustrated in the process of completing an exterior surface weld 50. Referring to FIG. 7, adaptor 10 is illustrated in the process of completing a weld 52 within a blind bore 54. It is to be noted that the configuration of tip 30 which is selected changes with the application. Referring to FIG. 8, a workpiece 56 is illustrated which in the process of having an attachment 58 welded to it. The bulk of workpiece 56 restricts access to a weld, generally indicated by reference numeral 60. Two alternative approaches to completing weld 60 are illustrated.

It will be apparent to one skilled in the art the advantages to be gained through the use of adaptor 10. The ability to change the configuration of tip 30 provides a number of advantages in and of itself. Different sizes of tips are commercially available which allows many wire sizes to be used with the same welding apparatus. A variety of tip configurations are available, which allows weld bead manipulation to achieve different size and shape. Tips can be replaced without dismantling of the arc welding apparatus which greatly decreases production down time. Short circuits and burn back are a common problem with submerged arc welding. When this occurs, only tip 30 need be replaced to restore the equipment to proper working order. The fact that no housing or shroud is required also provides advantages. Tip 30 is visible to the operator at all times. This enables greater accuracy in tip placement, which results in higher quality welds. Without a housing or shroud, adaptor 10 is much less cumbersome and can more readily be used in restricted areas such as small bore tubing and fittings. The use of two independent parallel feed tubes also provides advantages. If one of the feed tubes should become damaged due to mishandling, short circuiting or wear and tear; it can be easily replaced without major expense. Wire feed tube 12 is straight. This allows any size wire to be guided through by the drive wheel wire feeding mechanisms on conventional equipment. This is of increasing importance the longer adaptor 10 becomes. When guiding a wire 10 feet through wire feed tube 12, any bends or curves in the welding wire would cause enough friction to lodge the wire inside the arc welder. This also allows for various sizes of wires to be used in the same wire feed tube 12 simply by changing tip 30. Nut 26 and external threads 24 which are provided on exterior surface 20 at first end 16 of wire feed tube 12, allow for quick hook up to conventional welding equipment. It is a rigid form of attachment. As previously stated, this is important to enable adaptor 10 to reach deep into restricted inner diameter tubing without sagging.

Although adaptor 10 has been illustrated in FIGS. 6 through 8, in a relatively limited number of welding applications, it will be appreciated that adaptor 10 is extremely versatile and can be used for external surfacing, external seam welds, internal surfacing, internal seam welds, attachment welds, and the like. All these applications can be accomplished with adaptor 10 in a horizontal, vertical or inclined position. All these applications can be accomplished whether the workpiece is fixed in a stationary position or rotatably mounted. It will finally be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An adaptor for use with a Submerged Arc Welder, comprising:

a straight wire feed tube at least one foot in length, the wire feed tube having a first end and a second end;

means for attaching the first end of the wire feed tube to a wire feeding mechanism of a submerged arc welder;

means for attaching a tip to the second end of the wire feed tube;

a flux feed tube at least one foot in length, the flux feed tube having a first end and a second end, the flux feed tube being disposed immediately adjacent and substantially parallel to the wire feed tube with the second end of the flux feed tube adjacent the second end of the wire feed tube; and an insulating sheathing covering both the wire feed tube and the flux feed tube, thereby maintaining the wire feed tube and the flux feed tube in parallel relation.

2. The adaptor for use with a Submerged Arc Welder as defined in claim 1, wherein the wire feed tube is made out of a material with high thermal conductivity, such that heat within the wire feed tube is rapidly dissipated.

3. The adaptor for use with a Submerged Arc Welder as defined in claim 2, wherein the wire feed tube is made out of copper alloy.

4. The adaptor for use with a Submerged Arc Welder as defined in claim 1, wherein the flux feed tube is made out of a non-corrosive material.

5. The adaptor for use with a Submerged Arc Welder as defined in claim 4, wherein the flux feed tube is made out of stainless steel.

6. The adaptor for use with a Submerged Arc Welder as defined in claim 1, wherein the insulating sheath is made out of a woven glass material.

7. The adaptor for use with a Submerged Arc Welder as defined in claim 1, wherein the means for attaching a tip to the second end of the wire feed tube includes internal threads at the second end of the wire feed tube.

8. The adaptor for use with a Submerged Arc Welder as defined in claim 1, wherein the means for attaching the first end of the wire feed tube to a wire feeding mechanism of a submerged arc welder includes external threads at the first end of the wire feed tube.

9. An adaptor for use with a Submerged Arc Welder, comprising:

a straight wire feed tube at least one foot in length, the wire feed tube having a first end, a second end, an exterior surface and an interior bore extending between the first end and the second end, the wire feed tube being made out of a copper alloy material with high thermal conductivity, such that heat within the wire feed tube is rapidly dissipated;

external threads on the exterior surface at the first end of the wire feed tube, thereby providing means for attaching the first end of the wire feed tube to a wire feeding mechanism of a submerged arc welder;

internal threads within the interior bore at the second end of the wire feed tube thereby providing means for attaching a tip to the second end of the wire feed tube;

a flux feed tube at least one foot in length, the flux feed tube having a first end, a second end, an exterior surface and an interior bore extending between the first end and the second end, the flux feed tube being made out of a non-corrosive stainless steel material, the flux feed tube being disposed immediately adjacent and substantially parallel to the wire feed tube with the second end of the flux feed tube adjacent the second end of the wire feed tube;

the flux feed tube having a primary axis, the first end of the flux feed tube being angularly offset from the primary axis, thereby enabling attachment to a source of flux without interference from the wire feed tube; and an insulating sheathing made out of a woven glass material covering both the wire feed tube and the flux feed tube, thereby maintaining the wire feed tube and the flux feed tube in parallel relation.

* * * * *

REEXAMINATION CERTIFICATE (4479th)

United States Patent
Guenette et al.

(10) Number: US 5,525,773 C1
(45) Certificate Issued: Nov. 6, 2001

(54) ADAPTOR FOR USE WITH A SUBMERGED ARC WELDER

(75) Inventors: Robert A. Guenette; Pierre F. Guenette, both of Calgary (CA)

(73) Assignee: Capitan Welding Technologies, Inc., Calgary (CA)

Reexamination Request:
No. 90/005,564, Nov. 17, 1999

Reexamination Certificate for:
Patent No.: 5,525,773
Issued: Jun. 11, 1996
Appl. No.: 08/370,171
Filed: Jan. 9, 1995

(51) Int. Cl.[7] .................................................. B23K 9/18
(52) U.S. Cl. ............................................................ 219/73.2
(58) Field of Search ........................ 219/73, 73.2, 137.61

(56) References Cited

U.S. PATENT DOCUMENTS 3,582,599 * 6/1971 Yohn .
4,296,308 * 10/1981 Nakahama et al. .
5,134,268 * 7/1992 Capitanescu .
5,205,469 * 4/1993 Capitanescu .

OTHER PUBLICATIONS

Capitanescu, "Weld Surfacing of Small Pipe Internals", Welding Institute of Canada presentation, Nov. 1, 1986.*
Capitanescu, "Weld Surfacing of Samll Pipe Interiors", Welding Journal, Aug. 1989, pp. 29–34.*
Lincoln Welders Operating Manual IM–278–A.*
Lincoln Welders Operating Manual IM–279.*

* cited by examiner

Primary Examiner—Clifford C. Shaw

(57) ABSTRACT

An adaptor for use with a submerged arc welder is described which includes a wire feed tube and a flux feed tube. The wire feed tube is at least one foot in length and has a first end and a second end. Exterior threads are provided for attaching the first end of the wire feed tube to a wire feeding mechanism of a submerged arc welder. Interior threads are provided for attaching a tip to the second end of the wire feed tube. The flux feed tube is at least one foot in length and has a first end and a second end. The flux feed tube is disposed immediately adjacent and substantially parallel to the wire feed tube with the second end of the flux feed tube adjacent the second end of the wire feed tube. An insulating sheathing covers both the wire feed tube and the flux feed tube, thereby maintaining the wire feed tube and the flux feed tube in parallel relation.

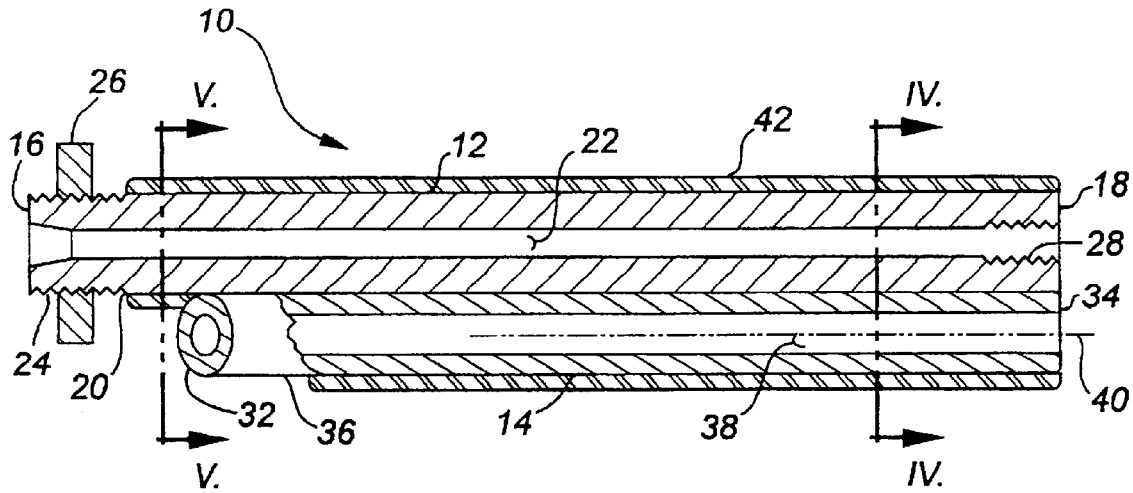

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–9 are cancelled.

\* \* \* \* \*